United States Patent
Feng

(10) Patent No.: US 10,233,304 B2
(45) Date of Patent: *Mar. 19, 2019

(54) BORON-CONTAINING NUCLEATING AGENT FOR POLYPHENYLENE SULFIDE

(71) Applicant: Ticona LLC, Florence, KY (US)

(72) Inventor: Ke Feng, Cincinnati, OH (US)

(73) Assignee: Ticona LLC, Florence, KY (US)

(*) Notice: Subject to any disclaimer, the term of this patent is extended or adjusted under 35 U.S.C. 154(b) by 299 days.

This patent is subject to a terminal disclaimer.

(21) Appl. No.: 13/709,190

(22) Filed: Dec. 10, 2012

(65) Prior Publication Data

US 2013/0156565 A1    Jun. 20, 2013

Related U.S. Application Data

(60) Provisional application No. 61/576,505, filed on Dec. 16, 2011, provisional application No. 61/665,384, filed on Jun. 28, 2012.

(51) Int. Cl.
    *C08L 81/02*      (2006.01)
    *C08K 3/38*      (2006.01)
    (Continued)

(52) U.S. Cl.
    CPC ............ *C08K 3/38* (2013.01); *B29C 45/0001* (2013.01); *C08J 5/00* (2013.01); *B29K 2081/04* (2013.01)

(58) Field of Classification Search
    CPC ............. C01P 2004/61; C01P 2004/50; C01P 2004/20; C01P 2006/22; C01P 2002/04;
    (Continued)

(56) References Cited

U.S. PATENT DOCUMENTS

| 4,511,709 A | 4/1985 | Yoon et al. |
| 4,690,972 A | 9/1987 | Johnson et al. |

(Continued)

FOREIGN PATENT DOCUMENTS

| EP | 0 055 480 A1 | 7/1982 |
| EP | 0 336 557 A1 | 10/1989 |

(Continued)

OTHER PUBLICATIONS

Machine translation of JP 2007051270 A, retrieved Oct. 29, 2013.*

(Continued)

*Primary Examiner* — Callie E Shosho
*Assistant Examiner* — Krupa Shukla
(74) *Attorney, Agent, or Firm* — Dority & Manning, P.A.

(57) ABSTRACT

A boron-containing nucleating agent is provided for use with a polyarylene sulfide. The boron-containing nucleating agent can have low crystallinity, a small particle size, and a large specific surface area. By selectively controlling certain aspects of the nucleating agent, the crystallization properties of a thermoplastic composition including the nucleating agent and a polyarylene sulfide can be significantly improved. For instance, the recrystallization temperature can be increased, which can allow the "cooling time" during a molding cycle to be substantially reduced. Through use of the boron-containing nucleating agent the recrystallization temperature can be greater than about 231° C.

21 Claims, 4 Drawing Sheets

(51) Int. Cl.
*B29C 45/00* (2006.01)
*C08J 5/00* (2006.01)
*B29K 81/00* (2006.01)

(58) Field of Classification Search
CPC .............. C01P 2006/12; C01P 2006/80; C01P 2006/90; C01P 2002/20; C01P 2004/64; C08K 3/38; C08L 81/02; C08L 81/04; B29K 2081/04; C10N 2220/82; C08G 75/14; C08G 75/02; C08G 75/12; C04B 35/583; C04B 2235/386; C04B 2235/5436; C04B 2235/5292; C04B 2235/5409; C04B 2235/767; B32B 27/286; B32B 2313/02
USPC .......... 264/328.14, 328.1; 415/200; 524/404, 524/420; 423/276, 290; 428/402, 704, 428/419, 323, 366; 525/535, 537; 523/445

See application file for complete search history.

(56) References Cited

U.S. PATENT DOCUMENTS

| | | | |
|---|---|---|---|
| 4,791,187 A | 12/1988 | Siiling et al. | |
| 4,933,386 A | 6/1990 | Nitoh et al. | |
| 4,952,662 A | 8/1990 | Finke et al. | |
| 5,028,644 A | 7/1991 | Heinz et al. | |
| 5,057,264 A | 10/1991 | Bier et al. | |
| 5,063,184 A | 11/1991 | Hagio et al. | |
| 5,151,458 A | 9/1992 | Heinz et al. | |
| 5,155,176 A | 10/1992 | Bagrodia et al. | |
| 5,252,656 A | 10/1993 | Nonaka et al. | |
| 5,258,442 A | 11/1993 | Kato et al. | |
| 5,258,450 A | 11/1993 | Nakata et al. | |
| 5,340,861 A | 8/1994 | Chen et al. | |
| 5,488,084 A | 1/1996 | Kadoi et al. | |
| 5,500,471 A | 3/1996 | Uota | |
| 5,578,659 A | 11/1996 | Anada et al. | |
| 5,589,524 A | 12/1996 | Ogita et al. | |
| 5,599,864 A | 2/1997 | Ogawa et al. | |
| 5,646,202 A | 7/1997 | Schleicher et al. | |
| 5,705,550 A | 1/1998 | Nakagawa | |
| 5,733,962 A | 3/1998 | Osako et al. | |
| 5,854,155 A | 12/1998 | Kawasaki et al. | |
| 6,316,536 B1 | 11/2001 | Okamoto et al. | |
| 6,319,602 B1 | 11/2001 | Fauzi et al. | |
| 6,605,660 B2 | 8/2003 | Nakamura et al. | |
| 6,660,241 B2 | 12/2003 | Clere et al. | |
| 6,713,088 B2 | 3/2004 | Lodyga et al. | |
| 6,764,975 B1 | 7/2004 | Clere | |
| 6,787,631 B2 | 9/2004 | Shiraishi et al. | |
| 6,951,583 B2 | 10/2005 | Clere et al. | |
| 7,432,339 B2* | 10/2008 | Mitchell | 528/373 |
| 7,445,797 B2 | 11/2008 | Meneghetti et al. | |
| 7,524,560 B2 | 4/2009 | Paisner et al. | |
| 7,527,859 B2 | 5/2009 | Zhong et al. | |
| 7,569,635 B2 | 8/2009 | Kojima et al. | |
| 7,662,324 B2 | 2/2010 | Pruss et al. | |
| 7,960,602 B2 | 6/2011 | Thierauf et al. | |
| 7,974,660 B2 | 7/2011 | Hsu et al. | |
| 7,976,941 B2 | 7/2011 | Lodyga et al. | |
| 8,044,142 B2 | 10/2011 | Akiyama et al. | |
| 8,142,899 B2 | 3/2012 | Yoshino | |
| 8,258,346 B2 | 9/2012 | Rajendran | |
| 8,288,466 B2 | 10/2012 | Lin et al. | |
| 8,357,737 B2 | 1/2013 | Tanaka et al. | |
| 8,487,042 B2 | 7/2013 | Okubo et al. | |
| 2001/0047053 A1 | 11/2001 | Okamoto et al. | |
| 2002/0006511 A1* | 1/2002 | Clere | 428/404 |
| 2002/0161089 A1 | 10/2002 | Nagatoshi et al. | |
| 2002/0161172 A1 | 10/2002 | Okamoto et al. | |
| 2002/0188096 A1 | 12/2002 | Tsubokura et al. | |
| 2003/0181560 A1 | 9/2003 | Kawaguchi et al. | |
| 2009/0043026 A1* | 2/2009 | Tanaka et al. | 524/277 |
| 2009/0111950 A1 | 4/2009 | Yamazaki et al. | |
| 2010/0048777 A1 | 2/2010 | Kodama et al. | |
| 2011/0134012 A1 | 6/2011 | Yang et al. | |
| 2013/0155597 A1 | 6/2013 | Luo et al. | |
| 2013/0157033 A1 | 6/2013 | Luo et al. | |
| 2013/0158179 A1* | 6/2013 | Feng et al. | 524/404 |
| 2013/0158212 A1 | 6/2013 | Luo et al. | |

FOREIGN PATENT DOCUMENTS

| | | |
|---|---|---|
| EP | 0 440 429 A2 | 8/1991 |
| EP | 0 852 249 A1 | 7/1998 |
| EP | 0 950 691 A1 | 10/1999 |
| JP | 10292115 A * | 11/1998 |
| JP | 2007051270 A * | 3/2007 |
| WO | WO 2008/042446 A2 | 4/2008 |
| WO | WO 2013/090172 A1 | 6/2013 |

OTHER PUBLICATIONS

Momentive Performance Materials, 2006-2007.*
Anthony Fontanelle, Get Effective Engine Cooling With a Pontiac Water Pump, 2007.*
Machine translation of JP 10292115 A, retrieved Apr. 1, 2015.*
Specific Surface Area, Calculator.org (http://www.calculator.org/property.aspx?name=specific%20surface), retrieved Apr. 1, 2015.*
Abstract of Japanese Patent—JPS57135859, Aug. 21, 1982, 2 pages.
Abstract of Japanese Patent—JPS5893718, Jun. 3, 1983, 2 pages.
Article—Leung et al., "Development of Thermally Conductive and Electrically Insulating Polymer Composites for Electronic Packaging Applications," *ANTEC*, Annual Technical Conference Proceedings, Sponsored by Society of Plastics Engineers, May 1-5, 2011, pp. 504-510.
Article—Nohara et al., "Study of crystalline behavior of poly (phenyllene sulfide)," *Polimeros*, vol. 16, No. 2, São Carlos Abr./Jun. 2006, 12 pages.
Article—Mai et al., "Nonisothermal Crystallization of Poly(phenylene sulfide) in Presence of Molten State of Crystalline Polyamide 6," *Journal of Applied Polymer Science*, vol. 74, 1999, pp. 3033-3039.
Article—Song et al., "Crystallization Kinetics and Nucleating Agents for Enhancing the Crystallization of Poly(p-Phenylene Sulfide)," *Polymer Engineering and Science*, vol. 30, No. 16, Aug. 1990, pp. 944-949.
Article—Ueda et al., "Synthesis of Sequential Polyamide by Direct Polycondensation," *Polymer Journal*, vol. 23, No. 3, 1991, pp. 167-176.
Article—Zhang et al., "Effect of a polyaryletherketone-bearing bulky substituent on the non-isothermal crystallization kinetics of polyphenylene sulfide," *Thermochimica Acta*, vol. 257, 1995, pp. 183-188.
Article—"Boron nitride finds new applications in thermoplastic compounds," *Plastics Additives and Compounding*, May/Jun. 2008, pp. 26-31.
Momentive Performance Materials and Material Safety Data Sheet for PolarTherm® Boron Nitride Powder Grade PT110, 9 pages, 2006-2007, 2010.
Momentive Performance Materials and Material Safety Data Sheet for PolarTherm® Boron Nitride Filler PT120, 8 pages, 2006-2007, 2010.
Momentive Performance Materials and Material Safety Data Sheet for PolarTherm® Boron Nitride Filler PT180, 8 pages, 2006-2007, 2010.
Technical Information No. CAT-0001, Sep. 2003, Denka Boron Nitride, Seongha Trading Co., Ltd., 4 pages.
Product Data Sheet on Combat® Boron Nitride Industrial Powders, Saint-Gobain Advanced Ceramics, 2005, 1 page.
Denka Product Information, Denka Boron Nitride, 1 page.
Denka Product Information, Denka Boron Nitride, Powder, 2005, 2 pages.
Search Report and Written Opinion for PCT/US2012/068675 dated May 21, 2013, 9 pages.
Abstract of German Patent—DE2041773, Feb. 14, 1972, 1 page.

(56) References Cited

OTHER PUBLICATIONS

Abstract of German Patent—DE3806836, Sep. 14, 1989, 1 page.
Abstract of European Patent—EP0405269, Jan. 2, 1991, 1 page.
Abstract of European Patent—EP0518022, Dec. 16, 1992, 1 page.
Abstract of European Patent—EP0523326, Jan. 20, 1993, 1 page.
Abstract of European Patent—JPS57135859, Aug. 21, 1982, 2 pages.
Abstract of Japanese Patent—JPS5861146, Apr. 12, 1983, 1 page.
Abstract of Japenese Patent—JPS5893718, Jun. 3, 1983, 2 pages.
Abstract of Japanese Patent—JPS5867752, Apr. 22, 1983 1 page.
Abstract of Japanese Patent—JPS58219233, Dec. 20 1983, 2 pages.
Abstract of Japanese Patent—JPS59196364, Nov. 7, 1984, 2 pages.
Abstract of Japanese Patent—JPS6049026, Mar. 18, 1985, 2 pages.
Abstract of Japanese Patent—JPS6227459, Feb. 5, 1987, 2 pages.
Abstract of Japanese Patent—JPS6454066, Mar. 1, 1989, 1 pages.
Abstract of Japanese Patent—JPH01225660, Sep. 8, 1989, 2 pages.
Abstract of Japanese Patent—JPH02225565, Sep. 7, 1990, 2 pages.
Abstract of Japanese Patent—JPH0345655, Feb. 27, 1991, 1 page.
Abstract of Japanese Patent—JPH0350265, Mar. 4, 1991, 1 page.
Abstract of Japanese Patent—JPH0441561, Feb. 12, 1992, 2 pages.
Abstract of Japanese Patent—JPH04103665, Apr. 6, 1992, 2 pages.
Abstract of Japanese Patent—JPH04198266, Jul. 17, 1992, 1 page.
Abstract of Japanese Patent—JPH04202362, Jul. 23, 1992, 1 page.
Abstract of Japanese Patent—JPH04202363, Jul. 23, 1992, 2 pages.
Abstract of Japanese Patent—JPH04239560, Aug. 27, 1992, 2 pages.
Abstract of Japanese Patent—JPH05140451, Jun. 8, 1993, 1 page.
Abstract of Japanese Patent—JPH05194849, Aug. 3, 1993, 1 page.
Abstract of Japanese Patent—JPH06166817, Jun. 14, 1994, 1 page.
Abstract of Japanese Patent—JPH07228778, Aug. 29, 1995, 1 page.
Abstract of Japanese Patent—JPH07292056, Nov. 7, 1995, 1 page.
Abstract of Japanese Patent—JPH07330877, Dec. 19, 1995, 2 pages.
Abstract of Japanese Patent—JPH08157716, Jun. 18, 1996, 2 pages.
Abstract of Japanese Patent—JPH08176436, Jul. 9, 1996, 2 pages.
Abstract of Japanese Patent—JPH08245806, Sep. 24, 1996, 2 pages.
Abstract of Japanese Patent—JPH08333513, Dec. 17, 1996, 1 page.
Abstract of Japanese Patent—JPH093327, Jan. 7, 1997, 2 pages.
Abstract of Japanese Patent—JPH10292114, Nov. 9, 1998, 1 page.
Abstract of Japanese Patent—JPH10310699, Nov. 24, 1998, 1 page.
Abstract of Japanese Patent—JP2001348479, Dec. 18, 2001, 1 page.
Abstract of Japanese Patent—JP2002129015, May 9, 2002, 1 page.
Abstract of Japanese Patent—JP2006225613, Aug. 31, 2006, 2 pages.
Abstract of Japanese Patent—JP2006225644, Aug. 31, 2006, 1 page.
Abstract of Japanese Patent—JP2007051270, Mar. 1, 2007, 1 page.
Abstract of Japanese Patent—JP2007070587, Mar. 22, 2007, 1 page.
Abstract of Japanese Patent—JP2007106949, Apr. 26, 2007, 1 page.
Abstract of Japanese Patent—JP2007106950, Apr. 26, 2007, 1 page.
Abstract of Japanese Patent—JP2007153992, Jun. 21, 2007, 2 pages.
Abstract of Japanese Patent—JP2011068813, Apr. 7, 2011, 1 page.
Abstract of Japanese Patent—JP2011132344, Jul. 7, 2011, 1 page.
Abstract of Polish Patent—PL92807, 1977 1 page.
Abstract of WO Patent—WO 2009/125556, Oct. 5, 2009, 1 page.
Abstract of Article—Shaul M. Aharoni, "Hydrogen-Bonded Highly Regular Strictly Alternating Aliphatic-Aromatic Liquid Crystalline Poly(ester amides)," *Macromolecules*, Vo. 21, 1988, pp. 1941-1961.
Abstract of Chinese Patent No. 101812239A dated Aug. 25, 2010, 1 page.
Chinese Search Report dated Apr. 29, 2015, 2 pages.

\* cited by examiner

US 10,233,304 B2

BORON-CONTAINING NUCLEATING AGENT FOR POLYPHENYLENE SULFIDE

RELATED APPLICATIONS

This application claims filing benefit of U.S. Provisional Patent Application Ser. Nos. 61/576,505 filed on Dec. 16, 2011 and 61/665,384 filed on Jun. 28, 2012, which are incorporated herein in their entirety.

BACKGROUND OF THE INVENTION

Polyarylene sulfide is a high performance polymer that can withstand high thermal, chemical, and mechanical stresses. Due to its relatively slow crystallization rate, however, injection molding of parts from polyarylene sulfide can be challenging. For example, to achieve the desired degree of crystallization, molding is generally conducted at a high mold temperature (~130° C. or more) and for a relatively long cycle time. Unfortunately, high mold temperatures typically dictate the need for expensive and corrosive heating mediums (e.g., oil).

Attempts to address the problems noted above have generally involved the inclusion of nucleating agents in the polymer composition to help improve the crystallization properties. For instance, boron nitride has often been utilized as a nucleating agent. Boron nitride nucleating agents exhibiting particular characteristics have been developed in an attempt to further improve characteristics of the polymers. For instance hexagonal boron nitride having a particular aspect ratio (e.g., greater than 2) and/or delaminated boron nitride particles with very high aspect ratios and very small dimensions have been formed. High purity boron nitride particles that exhibit high crystallinity have also been utilized as nucleating agents. In general, it has been assumed that the best route to enhancing the desirable characteristics of the boron nitride is by decreasing the size and increasing the purity of the particles.

To date, however, such attempts have not been fully satisfactory. In fact, the problems have become even more pronounced as various industries (e.g., electronic, automotive, etc.) are now demanding injection molded parts with very small dimensional tolerances. In these applications, the polymer must have good flow properties so that it can quickly and uniformly fill the small spaces of the mold cavity. It has been found, however, that conventional polyphenylene sulfides that manage to meet the requisite high flow requirement utilize nucleating agents that tend to require a long cooling cycle, which can be a very costly and time consuming step.

As such, a need exists for suitable nucleating agents for polyarylene sulfide that can provide a relatively short cycle time while still achieving good mechanical properties.

SUMMARY OF THE INVENTION

In accordance with one embodiment, a thermoplastic composition is disclosed that includes a boron-containing nucleating agent and a polyarylene sulfide. The boron-containing nucleating agent can have relatively poor crystallinity. For instance, the boron-containing nucleating agent can exhibit a graphitization index of greater than about 4. The boron-containing nucleating agent can also have a small average particle size and a relatively large specific surface area, for instance the ratio of the average particle size to the specific surface area can be between about 0.001 and about 1 ($\mu m/m^2/g$). The thermoplastic composition can have a high recrystallization temperature, for example greater than about 231° C., which can translate into a faster speed of recrystallization and shorter cycle times for a product formation process.

Products as may be formed from the composition are also disclosed. For example, a centrifugal pump for circulating a coolant through an automotive engine is disclosed. The pump comprises a pump impeller that is configured to flow the coolant radially outward into a volute chamber; and a housing that encloses the pump impeller and volute chamber, wherein at least a portion of the pump impeller, the housing, or both comprise a molded part formed from the thermoplastic composition that comprises a polyarylene sulfide and boron-containing nucleating agent.

Also disclosed are methods for molding the thermoplastic composition. The method comprises shaping a thermoplastic composition that comprises a polyarylene sulfide and a boron-containing nucleating agent as described herein. The method also includes cooling the thermoplastic composition. For instance, the method can include injection molding the polyarylene sulfide composition.

Other features and aspects of the subject matter are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
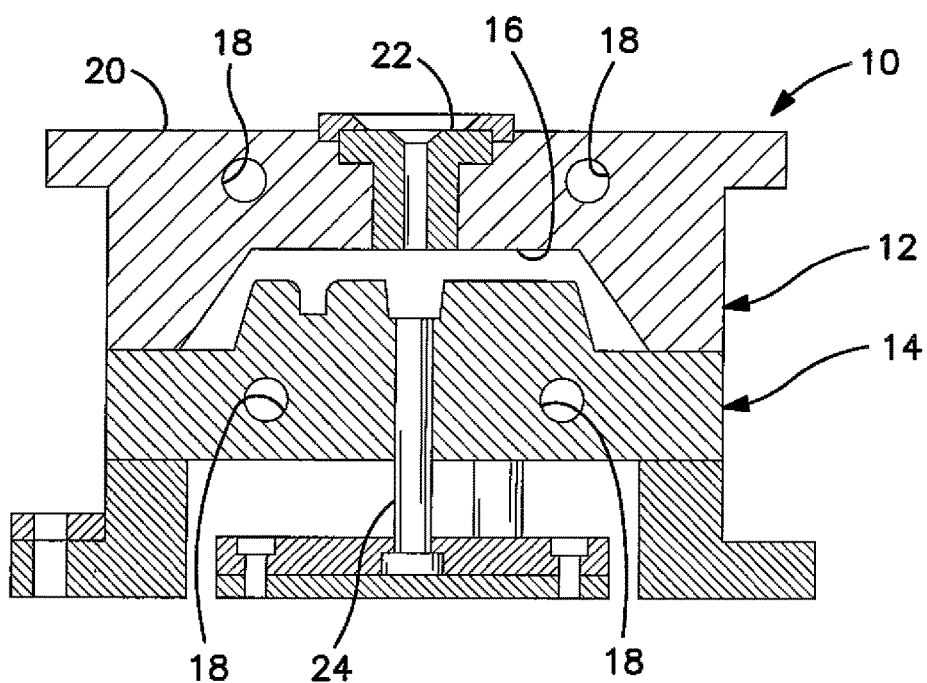
FIG. 1 is a cross-sectional view of one embodiment of an injection mold apparatus that may be employed in the present invention.

It is to be understood by one of ordinary skill in the art that the present discussion is a description of exemplary embodiments only, and is not intended as limiting the broader aspects of the present invention.

Generally speaking, the present disclosure is directed to a boron-containing nucleating agent that can be utilized for fast recrystallization of a polyarylene sulfide. By selectively controlling certain aspects of the nucleating agent, the crystallization properties of a thermoplastic composition including the nucleating agent and a polyarylene sulfide can be significantly improved. Among other things, the nucleating agent allows the "cooling time" during a molding cycle to be substantially reduced. The decrease in cooling time can be evidenced by increase in the recrystallization temperature, which can be increased by use of the boron-containing nucleating agent. Through use of the boron-containing nucleating agent, for example, the recrystallization temperature of a thermoplastic composition can be greater than about 231° C., greater than about 232° C., or greater than about 233° C.

In addition to increasing the recrystallization temperature of a thermoplastic composition, the boron-containing nucleating agent can increase the recrystallization energy, which can also reduce cooling time during a molding cycle. For example, a thermoplastic composition including a polyarylene sulfide and the boron-containing nucleating agent can exhibit recrystallization energy of greater than about 24 kilojoules per gram (kJ/g), greater than about 24.5 kJ/g, or greater than about 25 kJ/g.

Addition of the boron-containing nucleating agent to the thermoplastic composition can lead to little or no change in other characteristics of the composition. For example, the melt viscosity of the composition can exhibit little or no change due to the presence of the nucleating agent. Thus, the utilization of the boron-containing nucleating agent can significantly improve the temperature and timing of the molding process without detrimental impact with regard to other process parameters.

Use of the boron-containing nucleating agent can also allow parts to be molded at lower temperatures. For example, when considering an injection molding process, the mold temperature (e.g., temperature of a surface of the mold) may be from about 50° C. to about 120° C., in some embodiments from about 60° C. to about 110° C., and in some embodiments, from about 70° C. to about 90° C. In addition to minimizing the energy input requirements for the molding operation, such low mold temperatures may be accomplished using cooling mediums that are less corrosive and expensive than some conventional techniques. For example, liquid water may be employed as a cooling medium. Further, the use of low mold temperatures can also decrease the production of "flash" normally associated with high temperature molding operations. For example, the length of any flash (also known as burrs) created during an injection molding operation may be about 0.17 millimeters or less, in some embodiments about 0.14 millimeters or less, and in some embodiments, about 0.13 millimeters or less.

The total cooling time can be determined from the point when the composition is injected into the mold cavity to the point that it reaches an ejection temperature at which it can be safely ejected. Exemplary cooling times may range, for instance, from about 1 to about 60 seconds, in some embodiments from about 5 to about 40 seconds, and in some embodiments, from about 10 to about 35 seconds.

The boron-containing nucleating agent can exhibit relatively poor crystallinity. For instance, the nucleating agent can exhibit a surprisingly high graphitization index such as greater than about 4, greater than about 5, or greater than about 6. In one embodiment, the graphitization index can be between about 6 and about 10, for instance between about 7 and about 9.

Graphitization index (also commonly termed graphite index) is a parameter that describes the structural quality of the boron-containing particles. Boron-containing particles such as boron nitride exist in several crystalline forms including hexagonal, which is similar to graphite in structure; cubic, which is analogous to diamond; and wurtzite, which is similar to lonsdaleite (also called hexagonal diamond). Following formation, the boron-containing particles can have different degrees of crystallization. To measure this degree of crystallization, the structural figure of merit termed graphitization index has been developed. The graphitization index is derived from x-ray diffraction and is the ratio of the area under [(100)+(101)] peaks to the area under the (102) peak. The graphitization index describes the degree of order in the stacking of the layers along the c-axis of the material. The graphitization index can vary greatly, for instance from about 1 for well-ordered, highly crystalline particles up to about 50 for the so-called turbostratic particles, in which the layers show random rotations and translation about the normal.

Surprisingly, it has been found that through utilization of a boron-containing nucleating agent that exhibits relatively low crystallinity, the recrystallization characteristics of the polyarylene sulfide can be greatly improved. Specifically, the recrystallization temperature and recrystallization energy can be increased, which can decrease cycle times when forming a molded product. In addition to the beneficial functional capacity of the boron-containing nucleating agent during a molding process, the boron-containing nucleating agent can also enhance the crystallization properties of the composition.

In conjunction with the surprisingly low crystallinity, the boron-containing nucleating agent can also have a small particle size. For instance, the nucleating agent can have an average particle size of less than about 10 μm, less than about 9 μm, or less than about 8 μm. For example, the average particle size can be from about 0.5 μm to about 10 μm, or from about 1 μm to about 9 μm. Average particle size can be determined according to sedimentation techniques, laser diffraction methods, or any other suitable technique. For example, particle size distribution can be determined according to a standard testing method such as ASTM D4464 or ASTM B822.

The nucleating agent can also have a large specific surface area. The specific surface area can be, for example, greater than about 15 $m^2/g$, greater than about 17 $m^2/g$, or greater than about 19 $m^2/g$. In one embodiment, the specific surface area can be quite large, for instance greater than about 30 $m^2/g$. The specific surface area can be determined according to standard methods such as by the physical gas adsorption method (B.E.T. method) with nitrogen as the adsorption gas, as is generally known in the art and described by Brunauer, Emmet, and Teller (J. Amer. Chem. Soc., vol. 60, February, 1938, pp. 309-319).

The combination of small particle size and large specific surface area can provide a boron-containing nucleating agent that has a ratio of average particle size to specific surface area of between about 0.001 and about 1, for instance between about 0.01 and about 0.8, or between about 0.02 and about 0.25.

The nucleating agent particles can have any overall shape. For example, the nucleating agent can include high aspect ratio particles having a needle-like or plate-like structure. The boron-containing nucleation agent can also be in the form of aggregated particles, in which the individual high aspect ratio particles are aggregated together with no particular orientation or in a highly ordered fashion, for instance via weak chemical bonds such as Van der Waals forces. Non-aggregated larger particles can also be utilized. For instance particles including a large number of stacked plate-like primary particles can be utilized as well as particles in which the primary structure is not evident, such as granulated or pulverized particles formed of larger sintered bodies.

Suitable boron-containing nucleating agents may include any boron-containing material as is generally known in the art that may be provided with the disclosed characteristics. By way of example, boron-containing nucleating agent materials can include, without limitation, boron nitride, sodium tetraborate, potassium tetraborate, calcium tetraborate, etc., as well as mixtures thereof. Boron nitride (BN) has been found to be particularly beneficial. Boron nitride exists in a variety of different crystalline forms (e.g., h-BN—hexagonal, c-BN—cubic or sphalerite, and w-BN—wurtzite), any of which can generally be employed in the present invention. The hexagonal crystalline form may be utilized in one embodiment due to its stability and softness.

The nucleating agent can be formed according to any standard formation method. By way of example, boron nitride particles may be formed according to a process that includes a high temperature sintering of raw, essentially turbostratic powders as may be formed from reaction of boric acid with boron trioxide. Sintering can generally be carried out at a temperature of between about 1400° C. to about 2300° C. for a period of between about 0.5 and about 12 hours. Sintering can take place in an inert atmosphere, such as argon, or optionally in a nitrogen rich atmosphere. Sintering can be carried out under vacuum or in a pressurized atmosphere, as is known. A large sintered body can be granulated or pulverized according to any suitable process to form the nucleating agent particles including, without limitation, jaw crushing or roll crushing. Beneficially, as the boron-containing nucleating agent has a relatively poor crystallinity, the formation process can be carried out at a lower temperature as compared to higher crystalline particles. This can lead to cost savings in a formation process as well as for the products formed thereby.

Of course, other formation processes as are known in the art may alternatively be utilized such as reaction of boric acid with melamine followed by calcination (e.g., at a temperature of from about 40° C. to about 200° C. and a relative humidity of greater than about 5%) and addition of a crystallization catalyst such as boric acid or a borate salt of an alkali metal. By utilization of a small amount of crystallization catalyst, the graphitization index can be controlled to provide a nucleation agent having the desired level of crystallinity. For example, the crystallization catalyst can be used in an amount such that the molar ratio of the nitrogen of the boron nitride to the crystallization catalyst is greater than about 300 to obtain a boron nitride nucleation agent having a graphitization index of greater than about 4.

The nucleating agent component (i.e., one or more nucleating agents) typically constitutes from about 0.01 wt. % to about 6 wt. %, in some embodiments from about 0.05 wt. % to about 3 wt. %, and in some embodiments, from about 0.1 wt. % to about 2 wt. % of the thermoplastic composition.

A thermoplastic composition that includes the boron-containing nucleating agent can also include at least one polyarylene sulfide, which is generally able to withstand relatively high temperatures without melting. Although the actual amount may vary depending on desired application, polyarylene sulfide(s) typically constitute from about 30 wt % to about 95 wt. %, in some embodiments from about 35 wt. % to about 90 wt. %, and in some embodiments, from about 40 wt. % to about 80 wt. % of the thermoplastic composition. The polyarylene sulfide(s) generally have repeating units of the formula:

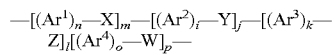

wherein,
Ar$^1$, Ar$^2$, Ar$^3$, and Ar$^4$ are independently arylene units of 6 to 18 carbon atoms;
W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—; and
n, m, i, j, k, l, o, and p are independently 0, 1, 2, 3, or 4, subject to the proviso that their sum total is not less than 2.

The arylene units Ar$^1$, Ar$^2$, Ar$^3$, and Ar$^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

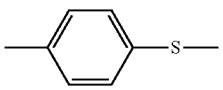

and segments having the structure of formula:

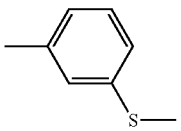

I or segments having the structure of formula:

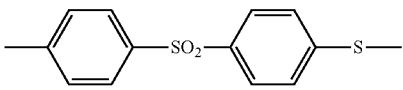

In another embodiment, a polyarylene sulfide copolymer may be formed that includes a first segment with a number-average molar mass Mn of from 1000 to 20,000 g/mol. The first segment may include first units that have been derived from structures of the formula:

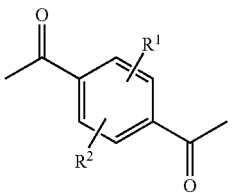

where the radicals $R^1$ and $R^2$, independently of one another, are a hydrogen, fluorine, chlorine or bromine atom or a branched or unbranched alkyl or alkoxy radical having from 1 to 6 carbon atoms; and/or second units that are derived from structures of the formula:

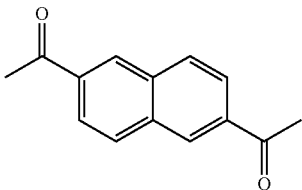 [SMILES: CC(=O)c1ccc2cc(C(C)=O)ccc2c1]

The first unit may be p-hydroxybenzoic acid or one of its derivatives, and the second unit may be composed of 2-hydroxynaphthalene-6-carboxylic acid. The second segment may be derived from a polyarylene sulfide structure of the formula:

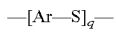

where Ar is an aromatic radical, or more than one condensed aromatic radical, and q is a number from 2 to 100, in particular from 5 to 20, The radical Ar may be a phenylene or naphthylene radical. in one embodiment, the second segment may be derived from poly(m-thiophenylene), from poly(o-thiophenylene), or from poly(p-thiophenylene).

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,6-tetramethylbiphenyl, 1,2,3,4-tetrachloronaphthalene, 1,2,4-tribromo-6-methylnaphthalene, etc., and mixtures thereof.

Regardless of the particular structure, the number average molecular weight of the polyarylene sulfide is typically about 15,000 g/mol or more, and in some embodiments, about 30,000 g/mol or more. In certain cases, a small amount of chlorine may be employed during formation of the polyarylene sulfide. Nevertheless, the polyarylene sulfide will still have a low chlorine content, such as about 1000 ppm or less, in some embodiments about 900 ppm or less, in some embodiments from about 1 to about 800 ppm, and in some embodiments, from about 2 to about 700 ppm. In certain embodiments, however, the polyarylene sulfide is generally free of chlorine or other halogens.

In addition to the boron-containing nucleating agent and polyarylene sulfide, the thermoplastic composition may also contain a variety of other different components to help improve its overall properties. One suitable additive that may be employed to improve the mechanical properties of the composition is an impact modifier. Examples of suitable impact modifiers may include, for instance, polyepoxides, polyurethanes, polybutadiene, acrylonitrile-butadiene-styrene, polysiloxanes etc., as well as mixtures thereof. In one particular embodiment, a polyepoxide modifier is employed that contains at least two oxirane rings per molecule. The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. The term "(meth)acrylic" includes acrylic and methacrylic monomers, as well as salts or esters thereof, such as acrylate and methacrylate monomers. Suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

If desired, additional monomers may also be employed in the polyepoxide to help achieve the desired melt viscosity. Such monomers may vary and include, for example, ester monomers, (meth)acrylic monomers, olefin monomers, amide monomers, etc. In one particular embodiment, for example, the polyepoxide modifier includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene. In one particularly desirable embodiment of the present invention, the polyepoxide modifier is a copolymer formed from an epoxy-functional (meth)acrylic monomeric component and α-olefin monomeric component. For example, the polyepoxide modifier may be poly(ethylene-co-glycidyl methacrylate). One specific example of a suitable polyepoxide modifier that may be used in the present invention is commercially available from Arkema under the name Lotader® AX8840. Lotader® AX8950 has a melt flow rate of 5 g/10 min and has a glycidyl methacrylate monomer content of 8 wt. %.

Still another suitable additive that may be employed to improve the mechanical properties of the thermoplastic composition is an organosilane coupling agent. The coupling agent may, for example, be any alkoxysilane coupling agent as is known in the art, such as vinlyalkoxysilanes, epoxyalkoxysilanes, aminoalkoxysilanes, mercaptoalkoxysilanes, and combinations thereof. Aminoalkoxysilane compounds typically have the formula: $R^5$—Si—$(R^6)_3$, wherein $R^5$ is selected from the group consisting of an amino group such as $NH_2$; an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R^6$ is an alkoxy group of from about 1 to about 10 atoms, or from about 2 to about 5 carbon atoms, such as methoxy, ethoxy, propoxy, and so forth. In one embodiment, $R^5$ is selected from the group consisting of aminomethyl, aminoethyl, aminopropyl, ethylene, ethyne, propylene and propyne, and $R^6$ is selected from the group consisting of methoxy groups, ethoxy groups, and propoxy groups. In another embodiment, $R^5$ is selected from the group consisting of an alkene of from about 2 to about 10 carbon atoms such as ethylene, propylene, butylene, and so forth, and an alkyne of from about 2 to about 10 carbon atoms such as ethyne, propyne, butyne and so forth, and $R^6$ is an alkoxy group of from about 1 to about 10 atoms, such as methoxy group, ethoxy group, propoxy group, and so forth. A combination of various aminosifanes may also be included in the mixture.

Some representative examples of aminosilane coupling agents that may be included in the mixture include aminopropyl triethoxysilane, aminoethyl triethoxysilane, aminopropyl trimethoxysilane, aminoethyl trimethoxysilane, ethylene trimethoxysilane, ethylene triethoxysilane, ethyne trimethoxysilane, ethyne triethoxysilane, aminoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl)tetramethoxysilane, bis(3-aminopropyl tetraethoxy disiloxane, and combinations thereof. The amino silane may also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One suitable amino silane is 3-aminopropyltriethoxysilane which is available from Degussa, Sigma Chemical Company, and Aldrich Chemical Company.

Fillers may also be employed in the thermoplastic composition to help achieve the desired properties and/or color. When employed, such mineral fillers typically constitute from about 5 wt. % to about 60 wt. %, in some embodiments from about 10 wt. % to about 50 wt. %, and in some embodiments, from about 15 wt. % to about 45 wt. % of the thermoplastic composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O$)($Al,Mg,Fe$)$_2$ ($Si,Al$)$_4O_{10}[(OH)_2$, ($H_2O$)]), montmorillonite (Na, Ca)$_{0.33}$($Al,Mg$)$_2Si_4O_{10}$($OH$)$_2 \cdot nH_2O$), vermiculite (($MgFe,Al$)$_3$($Al,Si$)$_4O_{10}$($OH$)$_2 \cdot 4H_2O$), palygorskite (($Mg,Al$)$_2Si_4O_{10}$($OH$)$\cdot 4(H_2O$)), pyrophyllite ($Al_2Si_4O_{10}$($OH$)$_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2$($AlSi_3$)$O_{10}$($OH$)$_2$), biotite ($K$($Mg,Fe$)$_3$($AlSi_3$)$O_{10}$($OH$)$_2$), phlogopite ($KMg_3$($AlSi_3$)$O_{10}$($OH$)$_2$), lepidolite ($K$($Li,Al$)$_{2-3}$($AlSi_3$)$O_{10}$($OH$)$_2$), glauconite ($K,Na$)($Al,Mg,Fe$)$_2$($Si,Al$)$_4O_{10}$($OH$)$_2$), etc., as well as combinations thereof.

Fibrous fillers may also be employed in the thermoplastic composition. When employed, such fibrous fillers typically constitute from about 5 wt. % to about 60 wt. %, in some embodiments from about 10 wt. % to about 50 wt. %, and in some embodiments, from about 15 wt. % to about 45 wt. % of the thermoplastic composition. The fibrous fillers may include one or more fiber types including, without limitation, polymer fibers, glass fibers, carbon fibers, metal fibers, and so forth, or a combination of fiber types. In one embodiment, the fibers may be chopped glass fibers or glass fiber rovings (tows). Fiber diameters can vary depending upon the particular fiber used and are available in either chopped or continuous form. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm.

Lubricants may also be employed in the thermoplastic composition that are capable of withstanding the processing conditions of poly(arylene sulfide) (typically from about 290° C. to about 320° C.) without substantial decomposition. Exemplary of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % of the thermoplastic composition.

Still another additive that may be employed in the thermoplastic composition is a disulfide compound. Without wishing to be bound by any particular theory, the disulfide compound can undergo a polymer scission reaction with a polyarylene sulfide during melt processing that even further lowers the overall melt viscosity of the composition. When employed, disulfide compounds typically constitute from about 0.01 wt. % to about 3 wt. %, in some embodiments from about 0.02 wt. % to about 1 wt. %, and in some embodiments, from about 0.05 wt. % to about 0.5 wt. % of the composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group. In certain embodiments, $R^3$ and $R^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. $R^3$ and $R^4$ may also include reactive functionality at terminal end(s) of the disulfide compound. For example, at least one of $R^3$ and $R^4$ may include a terminal carboxyl group, hydroxyl group, a substituted or non-substituted amino group, a nitro group, or the like. Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'-dithiomorpholine, 2,2'-dithiobis(benzothiazole), 2,2'-dithiobis (benzimidazole), 2,2'-dithiobis(benzoxazole) and 2-(4'-morpholinodithio)benzothiazole.

Still other additives that can be included in the composition may include, for instance, antimicrobials, pigments, antioxidants, stabilizers, surfactants, waxes, flow promoters, solid solvents, and other materials added to enhance properties and processability.

The manner in which the boron-containing nucleating agent, polyarylene sulfide, and other optional additives are combined may vary as is known in the art. For instance, the materials may be supplied either simultaneously or in sequence to a melt processing device that dispersively blends the materials. Batch and/or continuous melt processing techniques may be employed. For example, a mixer/ kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the polyarylene sulfide and nucleating agent may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 50° C. to about 500° C., and in some embodiments, from about 100° C. to about 250° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

Besides melt blending, other techniques may also be employed to combine the nucleating agent and the polyarylene sulfide. For example, the nucleating agent may be supplied during one or more stages of the polymerization of the polyarylene sulfide, such as to the polymerization apparatus. Although it may be introduced at any time, it is typically desired to apply the nucleating agent before polymerization has been initiated, and typically in conjunction with the precursor monomers for the polyarylene sulfide. The reaction mixture is generally heated to an elevated temperature within the polymerization reactor vessel to initiate melt polymerization of the reactants.

Regardless of the manner in which they are combined together, the degree and rate of crystallization of the thermoplastic composition may be significantly enhanced by the boron-containing nucleating agent. For example, the crystallization potential of the thermoplastic composition (prior to molding) may be about 52% or more, in some embodiments about 55% or more, in some embodiments about 58% or more, and in some embodiments, from about 60% to about 95%. The crystallization potential may be determined by subtracting the latent heat of crystallization ($\Delta H_c$) from the latent heat of fusion ($\Delta H_f$), dividing this difference by the latent heat of fusion, and then multiplying by 100. The latent heat of fusion ($\Delta H_f$) and latent heat of crystallization ($\Delta H_c$) may be determined by Differential Scanning calorimetry ("DSC") as is well known in the art and in accordance with ISO Standard 10350. The latent heat of crystallization may, for example, be about 15 Joules per gram ("J/g") or less, in some embodiments about 12 J/g or less, and in some embodiments, from about 1 to about 10 J/g. The latent heat of fusion may likewise be about 15 Joules per gram ("J/g") or more, in some embodiments about 18 J/g or more, and in some embodiments, from about 20 to about 28 J/g.

In addition, the thermoplastic composition may also crystallize at a lower temperature than would otherwise occur absent the presence of the nucleating agent. For example, the crystallization temperature (prior to molding) of the thermoplastic composition may about 250° C. or less, in some embodiments from about 100° C. to about 245° C., and in some embodiments, from about 150° C. to about 240° C. The melting temperature of the thermoplastic composition may also range from about 250° C. to about 320° C., and in some embodiments, from about 265° C. to about 300° C. The melting and crystallization temperatures may be determined as is well known in the art using differential scanning calorimetry in accordance with ISO Test No. 11357. Even at such melting temperatures, the ratio of the deflection temperature under load ("DTUL"), a measure of short term heat resistance, to the melting temperature may still remain relatively high. For example, the ratio may range from about 0.65 to about 1.00, in some embodiments from about 0.70 to about 0.99, and in some embodiments, from about 0.80 to about 0.98. The specific DTUL values may, for instance, range from about 230° C. to about 300° C., in some embodiments from about 240° C. to about 290° C., and in some embodiments, from about 250° C. to about 280° C. Such high DTUL values can, among other things, allow the use of high speed processes often employed during the manufacture of components having a small dimensional tolerance.

The present inventors have also discovered that the thermoplastic composition may possess a relatively low melt viscosity, which allows it to readily flow into the mold cavity during production of the part. For instance, the composition may have a melt viscosity of about 20 kilopoise or less, in some embodiments about 15 kilopoise or less, and in some embodiments, from about 0.1 to about 10 kilopoise, as determined by a capillary rheometer at a temperature of 316° C. and shear rate of 1200 seconds$^{-1}$. Among other things, these viscosity properties can allow the composition to be readily injection molded into parts having very small dimensions without producing excessive amounts of flash.

Conventional shaping processes can be used for forming articles out of the thermoplastic composition including, without limitation, extrusion, injection molding, blow-molding, thermoforming, foaming, compression molding, hot-stamping, fiber spinning and so forth. Shaped articles that may be formed may include structural and non-structural shaped parts, for instance for automotive engineering thermoplastic assemblies as well as industrial applications such a components of cooling tower pumps, water heaters, and the like. For instance thermoform sheets, foamed substrates, injection molded or blow molded components, fibers, and the like can be formed from the thermoplastic composition.

According to one embodiment, the thermoplastic composition can be processed according to an injection molding method. The injection molding method includes the injection of the thermoplastic composition into a mold cavity where it is cooled until reaching the desired ejection temperature. As discussed above, the unique properties of the boron-containing nucleating agent of the thermoplastic composition can allow the cooling time and/or mold temperature of a molding cycle to be substantially reduced. In addition to improving the properties of the cooling cycle, other aspects of the molding operation may also be enhanced. For example, as is known in the art, injection can occur in two main phases—i.e., an injection phase and holding phase. During the injection phase, the mold cavity is completely filled with the molten thermoplastic composition. The holding phase is initiated after completion of the injection phase in which the holding pressure is controlled to pack additional material into the cavity and compensate for volumetric shrinkage that occurs during cooling. After the shot has built, it can then be cooled. In addition to reducing the cooling time as discussed above, the improved properties of the thermoplastic composition may also allow for a lower holding time, which includes the time required to pack additional material into the cavity and the time at which this material is held at a certain pressure. Once cooling is complete, the molding cycle is completed when the mold opens and the part is ejected, such as with the assistance of ejector pins within the mold.

Any suitable injection molding equipment may generally be employed in the present invention. Referring to FIG. 1, for example, one embodiment of an injection molding apparatus or tool 10 that may be employed in the present invention is shown. In this embodiment, the apparatus 10 includes a first mold base 12 and a second mold base 14, which together define an article or component-defining mold cavity 16. The molding apparatus 10 also includes a resin flow path that extends from an outer exterior surface 20 of the first mold half 12 through a sprue 22 to a mold cavity 16. The resin flow path may also include a runner and a gate, both of which are not shown for purposes of simplicity. The thermoplastic composition may be supplied to the resin flow path using a variety of techniques. For example, the thermoplastic composition may be supplied (e.g., in the form of pellets) to a feed hopper attached to an extruder barrel that contains a rotating screw (not shown). As the screw rotates, the pellets are moved forward and undergo pressure and friction, which generates heat to melt the pellets. Additional heat may also be supplied to the composition by a heating medium that is communication with the extruder barrel. One or more ejector pins 24 may also be employed that are slidably secured within the second mold half 14 to define the mold cavity 16 in the closed position of the apparatus 10. The ejector pins 24 operate in a well-known fashion to remove a molded part from the cavity 16 in the open position of the molding apparatus 10.

A cooling mechanism may also be provided to solidify the resin within the mold cavity. In FIG. 1, for instance, the mold bases 12 and 14 each include one or more cooling lines 18 through which a cooling medium flows to impart the desired mold temperature to the surface of the mold bases for solidifying the molten material.

As a result of the boron-containing nucleating agent employed in the present invention, it has been discovered that the thermoplastic composition can be readily formed into parts having a wide range of different parts. The parts may be in the form of a substrate having an average thickness of about 25 millimeters or less, in some embodiments from about 0.5 to about 15 millimeters, and in some embodiments, from about 1 millimeter to about 10 millimeters. Alternatively, the part may simply possess certain features (e.g., walls, ridges, etc.) within the average thickness ranges noted above.

Regardless of the particular size, the present inventors have discovered that excellent mechanical properties can be achieved even when relatively short cooling times are employed. For instance, an injection molded part may exhibit a tensile strength of from about 100 to about 500 MPa, in some embodiments from about 120 to about 400 MPa, and in some embodiments, from about 190 to about 350 MPa. The part may also exhibit a tensile break strain of about 0.5% or more, in some embodiments from about 0.6% to about 10%, and in some embodiments, from about 0.8% to about 3.5%; and/or a tensile modulus of from about 5,000 MPa to about 25,000 MPa, in some embodiments from about 8,000 MPa to about 22,000 MPa, and in some embodiments, from about 10,000 MPa to about 20,000 MPa. The tensile properties may be determined in accordance with ISO Test No. 527 (technically equivalent to ASTM D638) at 23° C. The parts may also exhibit a flexural strength of from about 20 to about 500 MPa, in some embodiments from about 50 to about 400 MPa, and in some embodiments, from about 100 to about 350 MPa; a flexural break strain of about 0.5% or more, in some embodiments from about 0.6% to about 10%, and in some embodiments, from about 0.8% to about 3.5%; and/or a flexural modulus of from about 5,000 MPa to about 25,000 MPa, in some embodiments from about 8,000 MPa to about 22,000 MPa, and in some embodiments, from about 10,000 MPa to about 20,000 MPa. The flexural properties may be determined in accordance with ISO Test No. 178 (technically equivalent to ASTM D790) at 23° C. The part may also possess a high impact strength, such as an Izod notched impact strength greater than about 4 $kJ/m^2$, in some embodiments from about 5 to about 40 $kJ/m^2$, and in some embodiments, from about 6 to about 30 $kJ/m^2$, measured at 23° C. according to ISO Test No. 180) (technically equivalent to ASTM D256, Method A).

The resulting molded parts may be employed in a wide variety of different components. One particular component that may incorporate an molded part of the present invention is a liquid pump (e.g., water pump). The liquid pump may be a direct lift pump, positive displacement pump (e.g., rotary, reciprocating, or linear), rotodynamic pump (e.g., centrifugal), gravity pump, etc. Rotodynamic pumps, in which energy is continuously imparted to the pumped fluid by a rotating impeller, propeller, or rotor, are particularly suitable. In a centrifugal pump, for instance, fluid enters a pump impeller along or near to the rotating axis and is accelerated by the impeller, flowing radially outward into a diffuser or volute chamber, from which it exits into the downstream piping. Such pumps are often used in automotive applications to move a coolant through the engine. Due to the high temperatures associated with automotive engines, the thermoplastic composition is particularly well suited for use in the centrifugal pumps of such automotive cooling systems. In certain embodiments, for example, all or a portion (e.g., blades) of the water impeller may be formed from the thermoplastic composition. Centrifugal pumps also generally include a housing that encloses certain components of the pump and protects them from heat, corrosion, etc. In some embodiments, some or all of the housing may be formed from the thermoplastic composition.

Figure 2:
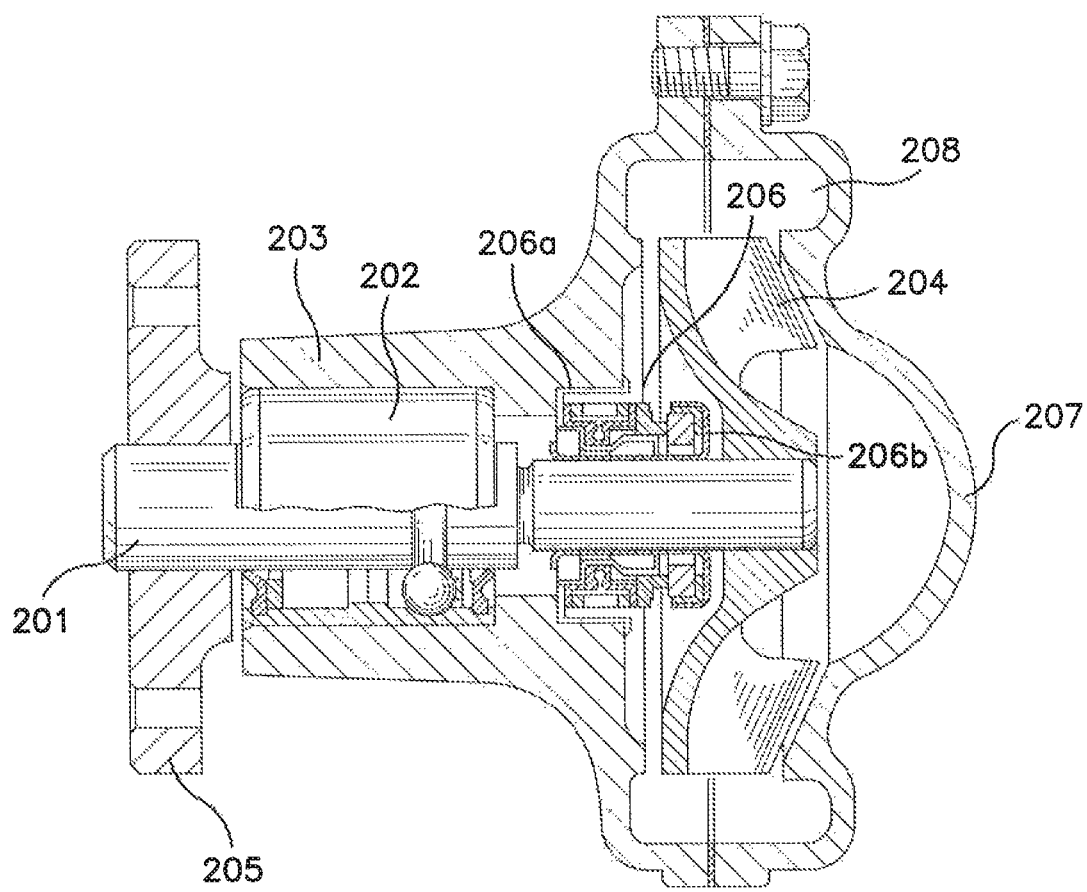
FIG. 2 illustrates a water pump that may be formed in accordance with one embodiment of the present invention.

Referring to FIG. 2, one particular example of a centrifugal pump is shown that can employ the thermoplastic composition of the present invention. In the illustrated embodiment, the pump contains a rotary shaft 201 supported on a housing 203 via a bearing 202. A pump impeller 204, which may contain the thermoplastic composition, is rigidly fixed at an end of the rotary shaft 201. A pulley hub 205 is also rigidly fixed on the base end portion of the rotary shaft 201. Between the bearing 202 and the pump impeller 204, a mechanical seal 206 is formed that is constituted by a stationary member 206a fixed on the side of the housing 203 and a rotary member 206b fixedly engaged with the rotary shaft 201. The pump may also include a housing 207, which can contain the thermoplastic composition. The housing 207 may be affixed to the pump housing 203 (e.g., with fastening bolts) so that a volute chamber 208 is defined therebetween. While not illustrated, a suction portion and a discharge port may also be provided within the housing 207.

Of course, the thermoplastic composition is not limited to the formation of water pumps or portions thereof, and it may be utilized in forming all manner of components, for instance components as may be incorporated in a fluid handling system including pipes and sections of pipes, flanges, valves, valve seats, seals, sensor housings, thermostats, thermostat housings, diverters, linings, propellers, and so forth. The composition may also employed in forming components that function in a fluid environment, such as consumer products that encounter high temperature fluids, e.g., heated beverage containers. Still further, the composition may be employed in completely different environments, such as an electronic component. Examples of electronic components that may employ a molded part include, for instance, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, camera modules, integrated circuits (e.g., SIM cards), etc.

Wireless electronic devices, however, are particularly suitable. Examples of suitable wireless electronic devices may include a desktop computer or other computer equipment, a portable electronic device, such as a laptop computer or small portable computer of the type that is sometimes referred to as "ultraportables." In one suitable arrangement, the portable electronic device may be a handheld electronic device. Examples of portable and handheld electronic devices may include cellular telephones, media players with wireless communications capabilities, handheld computers (also sometimes called personal digital assistants), remote controls, global positioning system ("GPS") devices, and handheld gaming devices. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

Figure 3:
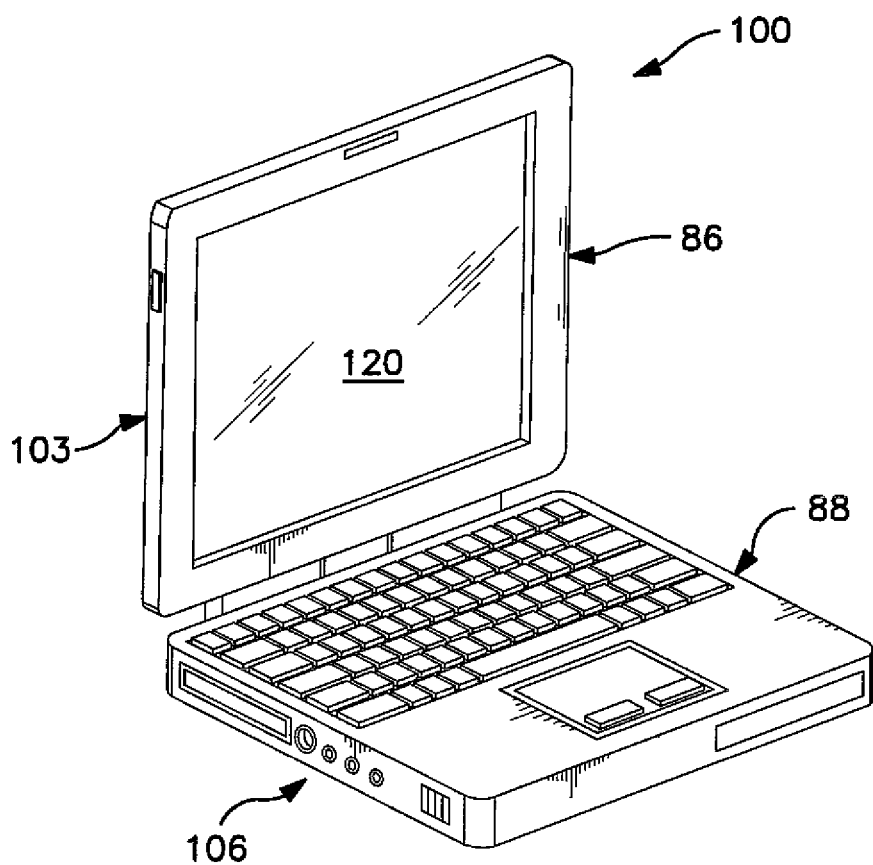
FIG. 3 is a perspective view of an electronic device that can be formed in accordance with one embodiment of the present invention.
Figure 4:
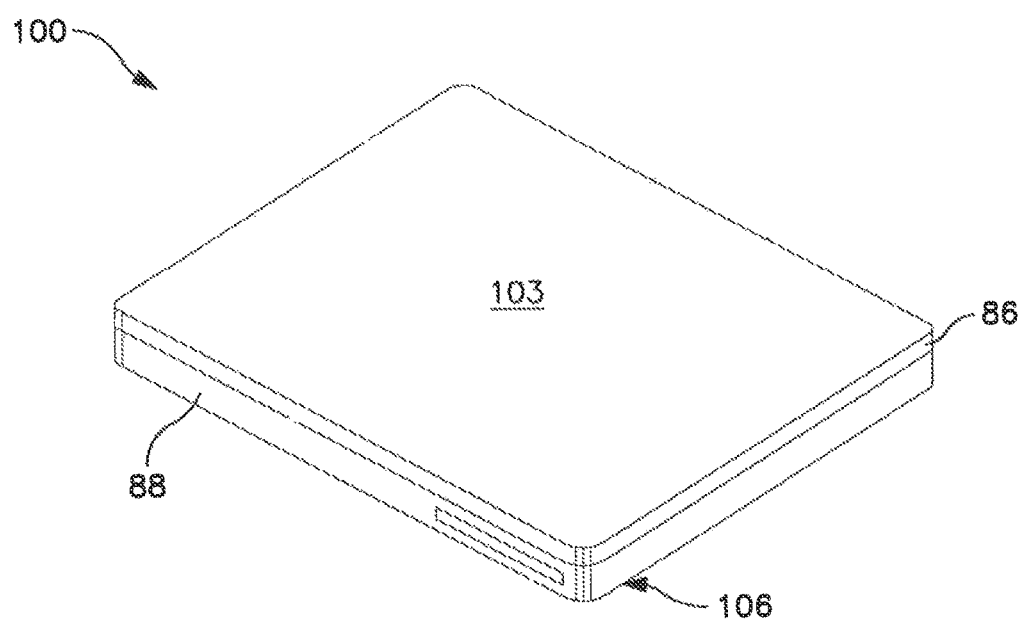
FIG. 4 is a perspective view of the electronic device of FIG. 2, shown in closed configuration.

Referring to FIGS. 3-4, one particular embodiment of an electronic device 100 is shown as a portable computer. The electronic device 100 includes a display member 103, such as a liquid crystal diode (LCD) display, an organic light emitting diode (OLED) display, a plasma display, or any other suitable display. In the illustrated embodiment, the device is in the form of a laptop computer and so the display member 103 is rotatably coupled to a base member 106. It should be understood, however, that the base member 106 is optional and can be removed in other embodiments, such as when device is in the form of a tablet portable computer. Regardless, in the embodiment shown in FIGS. 3-4, the display member 103 and the base member 106 each contain a housing 86 and 88, respectively, for protecting and/or supporting one or more components of the electronic device 100. The housing 86 may, for example, support a display screen 120 and the base member 106 may include cavities and interfaces for various user interface components (e.g., keyboard, mouse, and connections to other peripheral devices). Although the thermoplastic composition of the present invention may generally be employed to form any portion of the electronic device 100, for example for forming the cooling fan, it is typically employed to form all or a portion of the housing 86 and/or 88. When the device is a tablet portable computer, for example, the housing 88 may be absent and the thermoplastic composition may be used to form all or a portion of the housing 86. Regardless, due to the unique properties achieved by the present invention, the housing(s) or a feature of the housing(s) may be molded to have a very small wall thickness, such as within the ranges noted above.

Although not expressly shown, the device 100 may also contain circuitry as is known in the art, such as storage, processing circuitry, and input-output components. Wireless transceiver circuitry in circuitry may be used to transmit and receive radio-frequency (RF) signals. Communications paths such as coaxial communications paths and microstrip communications paths may be used to convey radio-frequency signals between transceiver circuitry and antenna structures. A communications path may be used to convey signals between the antenna structure and circuitry. The communications path may be, for example, a coaxial cable that is connected between an RF transceiver (sometimes called a radio) and a multiband antenna.

The present invention may be better understood with reference to the following examples.

Test Methods

Melt Viscosity: The melt viscosity is determined as scanning shear rate viscosity and determined in accordance with ISO Test No. 11443 (technically equivalent to ASTM D3835) at a shear rate of 1200 $s^{-1}$ and at a temperature of 316° C. using a Dynisco 7001 capillary rheometer. The rheometer orifice (die) had a diameter of 1 mm, a length of 20 mm, an L/D ratio of 20.1, and an entrance angle of 180°. The diameter of the barrel was 9.55 mm±0.005 mm and the length of the rod was 233.4 mm.

Recrystallization Temperature and Recrystallization Energy were determined by differential scanning calorimetry.

Example 1

A variety of boron nitride materials were utilized as nucleating agents as follows:

BN-1—SP-2 grade boron nitride powder available from Denki Kagaku Kogyo.

BN-2—NX-1 grade boron nitride powder available from Momentive Performance Materials, Inc.

BN-3—PCPS 3005 grade Combat® boron nitride powder available from Saint-Gobain Ceramics.

BN-4—PT110 grade PolarTherm® boron nitride powder available from Momentive Performance Materials, Inc.

BN-5—PT180 grade PolarTherm® boron nitride powder available from Momentive Performance Materials, Inc.

BN-6—HCV grade boron nitride powder available from Momentive Performance Materials, Inc.

BN-7—AC6111 grade boron nitride powder available from Momentive Performance Materials, Inc.

The boron nitride materials had physical characteristics as reported by the supplier provided in the table below:

| | Average particle size (μm) | Graphitization index | Specific surface area (SSA) ($m^2/g$) | Ratio of particle size to SSA | Purity (%) |
|---|---|---|---|---|---|
| BN-1 | 4 | — | — | — | 97 |
| BN-2 | 0.7 | 4 | 20 | 0.04 | ~98.5 |
| BN-3 | 0.9 | — | 20 | 0.45 | ~98 |
| BN-4 | 45 | 1 | 0.8 | 56 | ~99.5 |
| BN-5 | 8 | 1.8 | 17 | 0.47 | ~99.2 |
| BN-6 | 9 | >8 | 40 | 0.23 | ~97 |
| BN-7 | 1.2 | >8 | 39 | 0.03 | ~97.5 |

Thermoplastic compositions were formed including one of the boron nitride nucleating agents and additional components as described below:

Polyphenylene sulfide—Fortron® 0205 PPS

Glass fiber—10 μm diameter fiberglass 910a10c available from OCV™

Aminosilane—3-aminopropyltriethoxysilane—KBE-903 available from Shin-Etsu Silicone Lubricant—Glycolube® P available from Lonza Group Ltd.

The components are mixed in a Werner Pfleiderer ZSK 25 co-rotating intermeshing twin-screw extruder with a 25 mm diameter to form the samples as described in the table below.

| Sample | PPS (wt. %) | BN-1 (wt. %) | BN-2 (wt. %) | BN-3 (wt. %) | BN-4 (wt. %) | BN-5 (wt. %) | BN-6 (wt. %) | BN-7 (wt. %) | Lubricant (wt. %) | Aminosilane (wt. %) | Glass Fibers (wt. %) |
|---|---|---|---|---|---|---|---|---|---|---|---|
| 1 | 59.3 | — | — | — | — | — | — | — | 0.3 | 0.4 | 40 |
| 2 | 59.25 | 0.05 | — | — | — | — | — | — | 0.3 | 0.4 | 40 |
| 3 | 59.2 | 0.1 | — | — | — | — | — | — | 0.3 | 0.4 | 40 |
| 4 | 59.1 | 0.2 | — | — | — | — | — | — | 0.3 | 0.4 | 40 |
| 5 | 59.2 | — | 0.1 | — | — | — | — | — | 0.3 | 0.4 | 40 |
| 6 | 59.2 | — | — | 0.1 | — | — | — | — | 0.3 | 0.4 | 40 |
| 7 | 59.2 | — | — | — | 0.1 | — | — | — | 0.3 | 0.4 | 40 |
| 8 | 59.2 | — | — | — | — | 0.1 | — | — | 0.3 | 0.4 | 40 |
| 9 | 59.2 | — | — | — | — | — | 0.1 | — | 0.3 | 0.4 | 40 |
| 10 | 59.3 | — | — | — | — | — | — | — | 0.3 | 0.4 | 40 |
| 11 | 59.1 | 0.2 | — | — | — | — | — | — | 0.3 | 0.4 | 40 |
| 12 | 59.1 | — | 0.2 | — | — | — | — | — | 0.3 | 0.4 | 40 |
| 13 | 59.1 | — | — | — | — | 0.2 | — | — | 0.3 | 0.4 | 40 |
| 14 | 59.1 | — | — | — | — | — | — | 0.2 | 0.3 | 0.4 | 40 |

Properties of pellets formed from the samples are determined, the results of which are set forth in the table below.

| Sample | Melt Viscosity (kilopoise) | Re-Crystallization Temp (° C.) | Re-Crystallization Energy (kJ/g) |
|---|---|---|---|
| 1 | 4.40 | 209.6 | 23.84 |
| 2 | 4.40 | 233.1 | 25.1 |
| 3 | 4.45 | 234.1 | 25.87 |
| 4 | 4.51 | 234.2 | 25.63 |
| 5 | 4.43 | 234 | 24.83 |
| 6 | 4.54 | 232.8 | 24.36 |
| 7 | 4.38 | 230.7 | 24.6 |
| 8 | 4.32 | 232.7 | 24.69 |
| 9 | 4.61 | 233.9 | 24.55 |
| 10 | 4.74 | 224.2 | 23.71 |
| 11 | 4.91 | 233 | 25.16 |
| 12 | 4.42 | 232.4 | 23.95 |
| 13 | 4.62 | 233.8 | 24.42 |
| 14 | 4.77 | 234.8 | 25.23 |

As indicated above, the addition of the boron nitride nucleating agent having the smallest ratio of particle size to specific surface area (sample 14) has the higher recrystallization temperature, while control samples 1 and 10 and comparative sample 7 have much lower recrystallization temperatures.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A thermoplastic composition comprising:
   a linear polyphenylene polyarylene sulfide, that constitutes from about 30 wt. % to about 80 wt. % of the thermoplastic composition;
   glass fibers in an amount of from about 15 wt. % to about 50 wt. % of the thermoplastic composition;
   a boron-containing nucleating agent in an amount from about 0.05 wt. % to about 2 wt. % of the thermoplastic composition, wherein the boron-containing nucleating agent comprises boron nitride particles having a graphitization index of greater than about 4, an average particle size of from about 1 to less than 9 micrometers, and a specific surface area, wherein the ratio of the average particle size to the specific surface area is between about 0.001 and about 1 micrometers per square meter per gram;
   wherein the thermoplastic composition has a recrystallization temperature of greater than about 231° C. and a recrystallization energy of about 25 kilojoules per gram or more, as determined according to differential scanning calorimetry.

2. The thermoplastic composition of claim 1, wherein the ratio of the average particle size to the specific surface area of the boron nitride particles is between about 0.01 and about 0.8.

3. The thermoplastic composition of 1, wherein the specific surface area of the boron nitride particles is greater than about 15 square meters per gram.

4. The thermoplastic composition of claim 1, wherein the graphitization index of the boron nitride particles is greater than about 5.

5. The thermoplastic composition of claim 1, wherein the boron nitride particles are in a hexagonal crystalline form.

6. The thermoplastic composition of claim 1, wherein the thermoplastic composition further comprises a lubricant.

7. The thermoplastic composition of claim 1, wherein the thermoplastic composition further comprises a mineral filler.

8. The thermoplastic composition of claim 1, wherein the thermoplastic composition further comprises an organosilane coupling agent.

9. The thermoplastic composition of claim 1, wherein the boron nitride particles have an average particle size ranging from about 1 to less than 4 micrometers.

10. The thermoplastic composition of claim 9, wherein the boron nitride particles have an average particles size of from about 1 to about 1.2 micrometers.

11. A molded part comprising the thermoplastic composition of claim 1.

12. The molded part according to claim 11, wherein the molded part is injection molded.

13. A liquid pump comprising the molded part of claim 11.

14. The liquid pump of claim 13, wherein the pump is a direct lift pump, positive displacement pump, rotodynamic pump, or gravity pump.

15. The liquid pump of claim 13, wherein the pump is a centrifugal pump for circulating a coolant through an automotive engine.

16. A method for molding a thermoplastic composition, the method comprising:
    shaping a thermoplastic composition, wherein the thermoplastic composition comprises
    a linear polyphenylene sulfide, that constitutes from about 30 wt. % to about 80 wt. % of the thermoplastic composition;
    glass fibers in an amount of from about 15 wt. % to about 50 wt. % of the thermoplastic composition;
    a boron-containing nucleating agent in an amount from about 0.05 wt. % to about 2 wt. % of the thermoplastic composition, wherein the boron-containing nucleating agent comprises boron nitride particles having a graphitization index of greater than about 4, an average particle size of from about 1 to less than 9 micrometers, and a specific surface area, wherein the ratio of the average particle size to the specific surface area is between about 0.001 and about 1 micrometers per square meter per gram,
    wherein the thermoplastic composition has a recrystallization temperature of greater than about 231° C. and a recrystallization energy of about 25 kilojoules per gram or more, as determined according to differential scanning calorimetry;
    subjecting the thermoplastic composition to a cooling cycle.

17. The method of claim 16, wherein the step of shaping the thermoplastic composition comprises injecting the thermoplastic composition into a mold cavity.

18. The method of claim 17, wherein a mold temperature is from about 50° C. to about 120° C.

19. The method of claim 16, wherein a flash formed during the step of shaping the thermoplastic composition is about 0.17 millimeters or less.

20. The method of claim 16, wherein the total time of the cooling cycle is from about 1 to about 60 seconds.

21. The method of claim 16, wherein water is used as a cooling medium during the cooling cycle.

* * * * *